(12) United States Patent
Suzuki et al.

(10) Patent No.: US 8,800,947 B2
(45) Date of Patent: Aug. 12, 2014

(54) STEPPED LOWERING DEVICE AND STEPPED LIFTER DEVICE

(75) Inventors: Hiroyuki Suzuki, Toyohashi (JP);
Hidehiko Fujioka, Toyokawa (JP);
Hiroshi Koga, Toyokawa (JP)

(73) Assignee: Shiroki Corporation, Fujisawa-shi (JP)

( * ) Notice: Subject to any disclaimer, the term of this patent is extended or adjusted under 35 U.S.C. 154(b) by 99 days.

(21) Appl. No.: 13/553,105

(22) Filed: Jul. 19, 2012

(65) Prior Publication Data

US 2012/0279332 A1 Nov. 8, 2012

Related U.S. Application Data

(63) Continuation of application No. PCT/JP2011/050936, filed on Jan. 20, 2011.

(30) Foreign Application Priority Data

Jan. 21, 2010 (JP) ................. 2010-010689

(51) Int. Cl.
*F16M 11/00* (2006.01)
*B60N 2/16* (2006.01)
*F16H 31/00* (2006.01)

(52) U.S. Cl.
CPC ............... *B60N 2/165* (2013.01); *B60N 2/167* (2013.01); *F16H 31/002* (2013.01); *B60N 2/161* (2013.01); *B60N 2/1615* (2013.01)
USPC ........................ 248/421; 248/422; 297/344.15

(58) Field of Classification Search
USPC ......... 248/421, 422, 396; 297/344.15, 367 R, 297/284.11, 344.14
See application file for complete search history.

(56) References Cited

U.S. PATENT DOCUMENTS 4,762,366 A * 8/1988 Bauer et al. ............... 297/367 R
5,466,047 A 11/1995 Bauer et al.
(Continued)

FOREIGN PATENT DOCUMENTS

CN 101277841 A 10/2008
DE 102008063352 * 9/2009
(Continued)

OTHER PUBLICATIONS

International Search Report, dated Feb. 15, 2011, issued in corresponding PCT/JP2011/050936.

(Continued)

*Primary Examiner* — Terrell McKinnon
*Assistant Examiner* — Daniel Breslin
(74) *Attorney, Agent, or Firm* — Millen, White, Zelano, Branigan, P.C.

(57) ABSTRACT

A stepped lowering device includes a lifting/lowering link having a pivot on a base and on an ascending/descending body; a toothed link pivoted on the base or the ascending/descending body, includes a link ratchet and swings in association with the lifting/lowering link; an input member, supported by the ascending/descending body or the base; a first lowering prevention latch mechanism engaged with the link ratchet to prevent the toothed link swinging downward when the input member is in a neutral position and allows the toothed link to swing downward when the input member is swung in a lowering direction; and a second lowering prevention latch mechanism which allows the toothed link to swing downward by one tooth of the link ratchet and which is engaged with the link ratchet to prevent the toothed link further swinging downward.

10 Claims, 15 Drawing Sheets

(56) References Cited

U.S. PATENT DOCUMENTS

| | | | |
|---|---|---|---|
| 5,788,330 A * | 8/1998 | Ryan | 297/378.12 |
| 6,209,955 B1 * | 4/2001 | Seibold | 297/216.13 |
| 6,422,651 B1 * | 7/2002 | Muhlberger et al. | 297/344.12 |
| 6,533,351 B2 * | 3/2003 | Deptolla | 297/216.2 |
| 6,666,423 B1 * | 12/2003 | Nemoto | 248/421 |
| 7,654,615 B2 * | 2/2010 | Ventura et al. | 297/344.15 |
| 7,828,384 B2 * | 11/2010 | Shinozaki | 297/344.15 |
| 8,241,165 B2 * | 8/2012 | Nadgouda et al. | 475/177 |
| 8,585,148 B2 * | 11/2013 | Yamada et al. | 297/344.15 |
| 8,590,971 B2 * | 11/2013 | Ito et al. | 297/344.15 |
| 8,616,636 B2 * | 12/2013 | Arata | 297/216.16 |
| 2008/0007104 A1 * | 1/2008 | Yokota | 297/344.15 |
| 2008/0224519 A1 | 9/2008 | Ventura et al. | |
| 2009/0058158 A1 * | 3/2009 | Sobieski | 297/338 |
| 2009/0206643 A1 * | 8/2009 | Yamamoto | 297/313 |
| 2010/0253110 A1 * | 10/2010 | Yamada et al. | 296/65.08 |
| 2010/0289314 A1 * | 11/2010 | Nadgouda et al. | 297/344.12 |
| 2013/0161989 A1 * | 6/2013 | Ito | 297/313 |

FOREIGN PATENT DOCUMENTS

| | | | |
|---|---|---|---|
| EP | 1905640 A3 * | 12/2010 | |
| JP | 7-195969 A | 8/1995 | |
| JP | 2001-270353 A | 10/2001 | |
| JP | 2001-277914 A | 10/2001 | |
| JP | 2001-327356 A | 11/2001 | |
| JP | 2000-190762 A | 7/2007 | |
| WO | 2007031335 A1 | 3/2007 | |

OTHER PUBLICATIONS

Official Action dated Apr. 3, 2014, related to corresponding Chinese Patent Application No. 201180006664.3.

* cited by examiner

STEPPED LOWERING DEVICE AND STEPPED LIFTER DEVICE

RELATED APPLICATION DATA

This is a continuation of International Application No. PCT/JP2011/050936, with an international filing date of Jan. 20, 2011, which is herein incorporated by reference in its entirety.

TECHNICAL FIELD

The present invention relates to a stepped lowering device capable of stepwisely lowering an ascending/descending body (e.g., a seat seating surface) by reciprocating swing motion of an input member, and further relates to a stepped lifter device capable of stepwisely lifting the same ascending/descending body in a lifting direction also.

BACKGROUND ART

For instance, devices for lifting and lowering a vehicle seat seating surface are roughly classified into stepless lifter devices and stepped lifter devices which lift the seating surface steplessly and stepwisely, respectively.

CITATION LIST

Patent Literature

Patent Literature 1: Japanese Unexamined Patent Publication No. H07-195969
Patent Literature 2: Japanese Unexamined Patent Publication No. 2000-190762
Patent Literature 3: U.S. Pat. No. 5,466,047

SUMMARY OF THE INVENTION

Technical Problem

Out of such devices, stepless lifter devices are mechanically complicated and high in cost, though having that the advantage of not being influenced by body weight, and hence being superior in operability. On the other hand, although stepped lifter devices are relatively simple in structure, there is a problem in the operability (sense of use) thereof, so that few stepped lifter devices have in fact been put in practical use.

The present invention provides a lifter device (stepped lowering device) which is capable of lifting and lowering (lowering in particular) in a stepwise manner in particular, is simple in structure, superior in operability and inexpensive.

Solution to Problem

A stepped lowering device according to the present invention is characterized by including a lifting/lowering link having a pivot on a base and a pivot on an ascending/descending body; a toothed link which is pivoted on one of the base and the ascending/descending body via a pivot, includes a link ratchet positioned on a circular arc about the pivot, and swings in association with the lifting/lowering link; an input member, supported by the one of the ascending/descending body and the base that includes the pivot that serves as a center of the circular arc of the link ratchet, to be capable of being operated to swing between a neutral position and a down position; a first lowering prevention latch mechanism which is engaged with the link ratchet to prevent the toothed link from swinging downward when the input member is in the neutral position and which allows the toothed link to swing downward when the input member is operated to swing in a lowering direction; and a second lowering prevention latch mechanism which allows the toothed link which is allowed to swing downward by the first lowering prevention latch mechanism to swing downward by an amount corresponding to one tooth of the link ratchet, and which is engaged with the link ratchet to prevent the toothed link from further swinging downward.

It is possible for the second lowering prevention latch mechanism to include a second latch which is supported to be rotatable relative to the input member; a biasing spring which biases and rotates the second latch in a direction to make the second latch engaged with the link ratchet; and a linking portion which is installed between the input member and the second latch and defines a limit of rotation of the second latch caused by the biasing spring, and wherein the linking portion causes the second latch to swing with the input member when the input member is made to swing in the lowering direction from the neutral position, and causes only the input member to swing in the lowering direction while charging the biasing spring when the input member further swings in the lowering direction after the second latch is engaged with the link ratchet immediately before the first lowering prevention latch mechanism allows the toothed link to swing downward.

It is desirable to further include a neutral-position returning device which returns the input member to the neutral position upon an operating force which is exerted on the input member being released, wherein the first lowering prevention latch mechanism prevents the toothed link from swinging downward when the input member is in the neutral position.

The number of elements can be reduced by making the lifting/lowering link and the toothed link the same member.

On the other hand, the degree of freedom in configuration can be increased by the lifting/lowering link and the toothed link being separate members from each other and being linked with each other via a coupling link.

According to another aspect of the present invention, it is possible for the lifting/lowering link and the toothed link to be separate members from each other and to be integrally joined to the pivot of the lifting/lowering link on the base side or the pivot of the lifting/lowering link on the ascending/descending body side at different positions in an axial direction of the pivot.

In an embodiment of a stepped lifter device equipped with the stepped lowering device according to the present invention, the input member can be operated to further swing in a lifting direction from the neutral position, and wherein the stepped lowering device further includes a lifting-direction stepped rotation transmission mechanism which transmits rotation of the input member to the lifting/lowering link when the input member is operated to swing in the lifting direction from the neutral position.

The lifting-direction stepped rotation transmission mechanism of the stepped lifter device can be structured to include a lifting-directional-motion transmission ratchet supported to be capable of rotating relative to the input member; a motion transmission latch which is supported by the input member and engaged with the lifting-directional-motion transmission ratchet, and the motion transmission latch rotates the lifting-directional-motion transmission ratchet with the input member when the input member is made to swing upward; an input pinion which rotates in association with the motion transmission ratchet; and a link pinion which is formed on the toothed link and engaged with the input pinion.

It is desirable that the stepped lifter device further includes a neutral-position returning device which returns the input member to the neutral position upon an operating force which is exerted on the input member being released, wherein the stepped lifter device does not transmit rotation of the input member to the lifting/lowering link when the input member returns to the neutral position.

Advantageous Effects of the Invention

According to the present invention, a stepped lowering device having a simple structure that is capable of stepwisely lowering an ascending/descending body by a reciprocating swing motion of the input member between a neutral position and a down position can be obtained at a low cost. If the input member is made to be capable of swinging reciprocally from the neutral position to the up position, a stepped raising device (stepped lifter device) can also be obtained at the same time.

DESCRIPTION OF THE EMBODIMENTS

Figure 1:
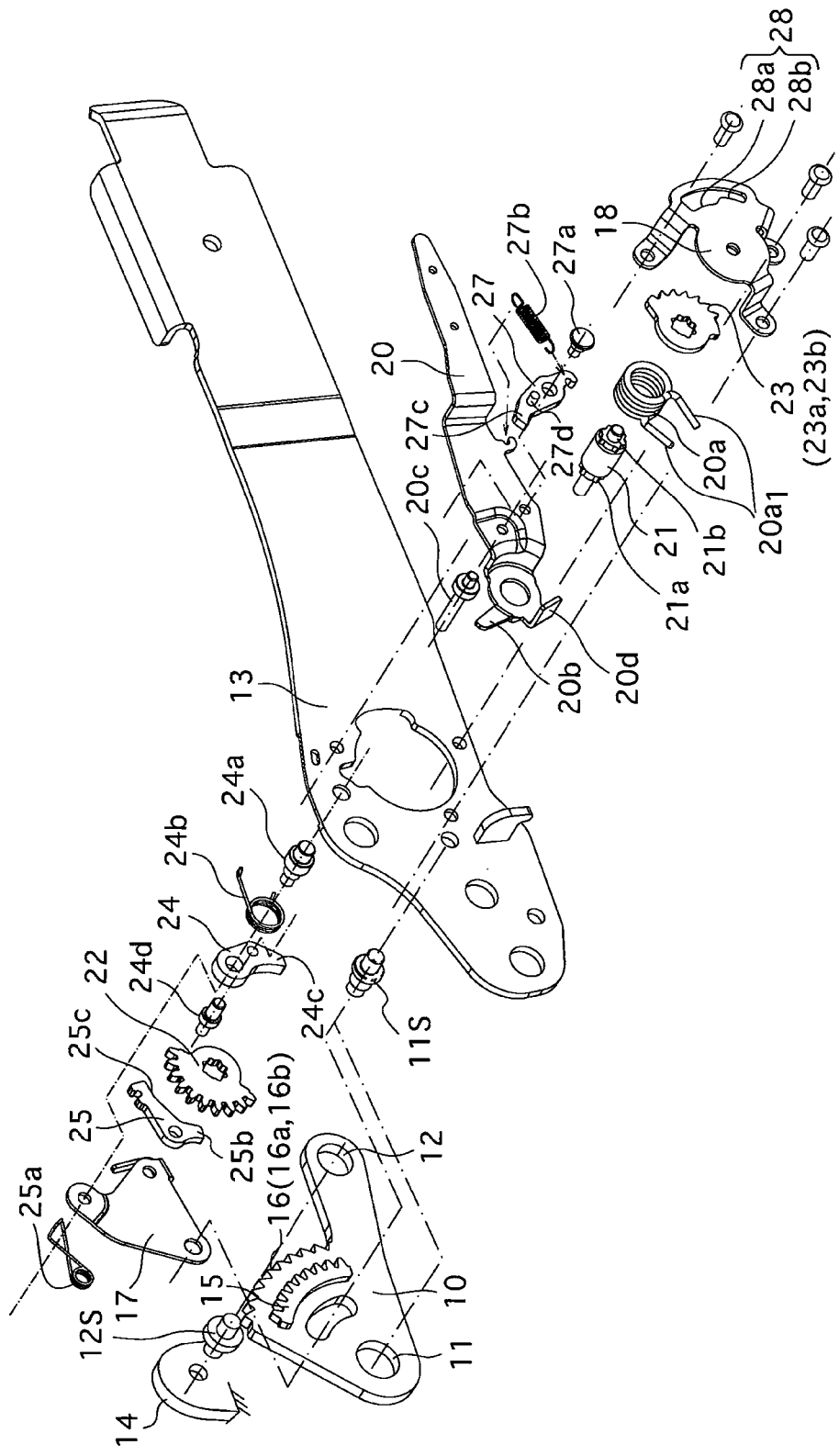
FIG. 1 is an exploded perspective view of an embodiment of a stepped lifter device equipped with a stepped lowering device according to the present invention.
Figure 2:
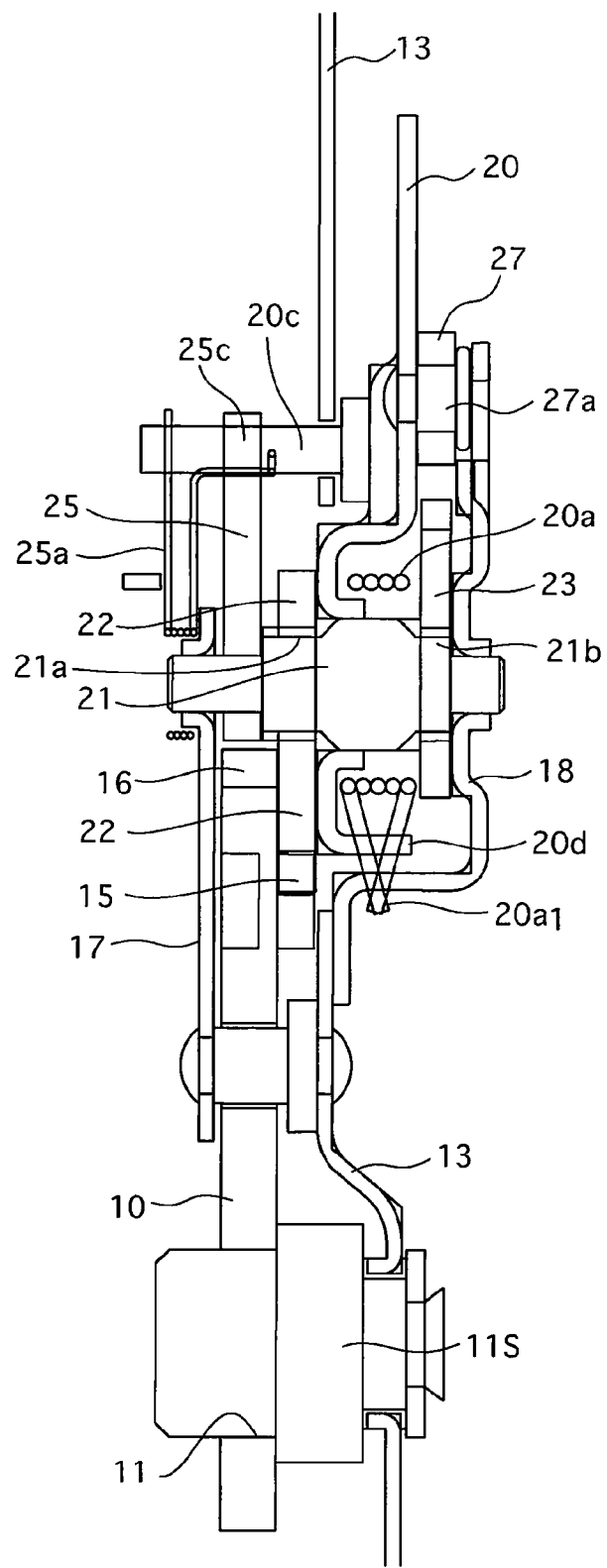
FIG. 2 is a sectional view taken along the line II-II shown in FIG. 4 in an assembled state of the stepped lifter device.
Figure 3:
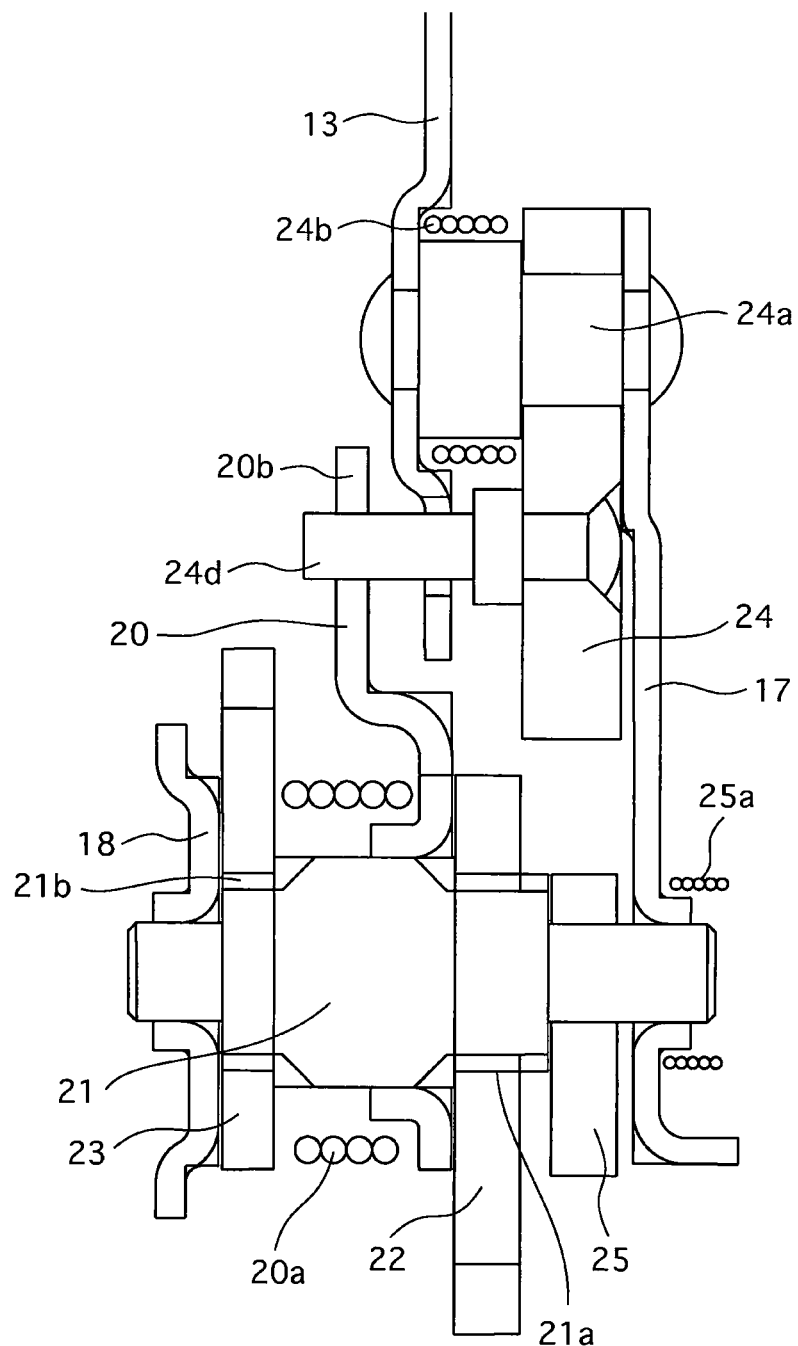
FIG. 3 is a sectional view taken along the line III-III shown in FIG. 4 in the same assembled state of the stepped lifter device.

The illustrated embodiment shows an embodiment of a vehicle seat height adjusting device to which the present invention has been applied. The exploded perspective view shown in FIG. 1 shows all the elements of the present embodiment of the vehicle seat height adjusting device; however, not properly illustrating the front and rear (both sides) positional relationship of each element. FIGS. 2 and 3 show sectional views taken at different positions in an assembled state of the stepped lifter device and properly illustrate the top and bottom (both sides) positional relationship of each element. First, the overall structure will be hereinafter discussed with reference to FIGS. 1 through 3.

Figure 4:
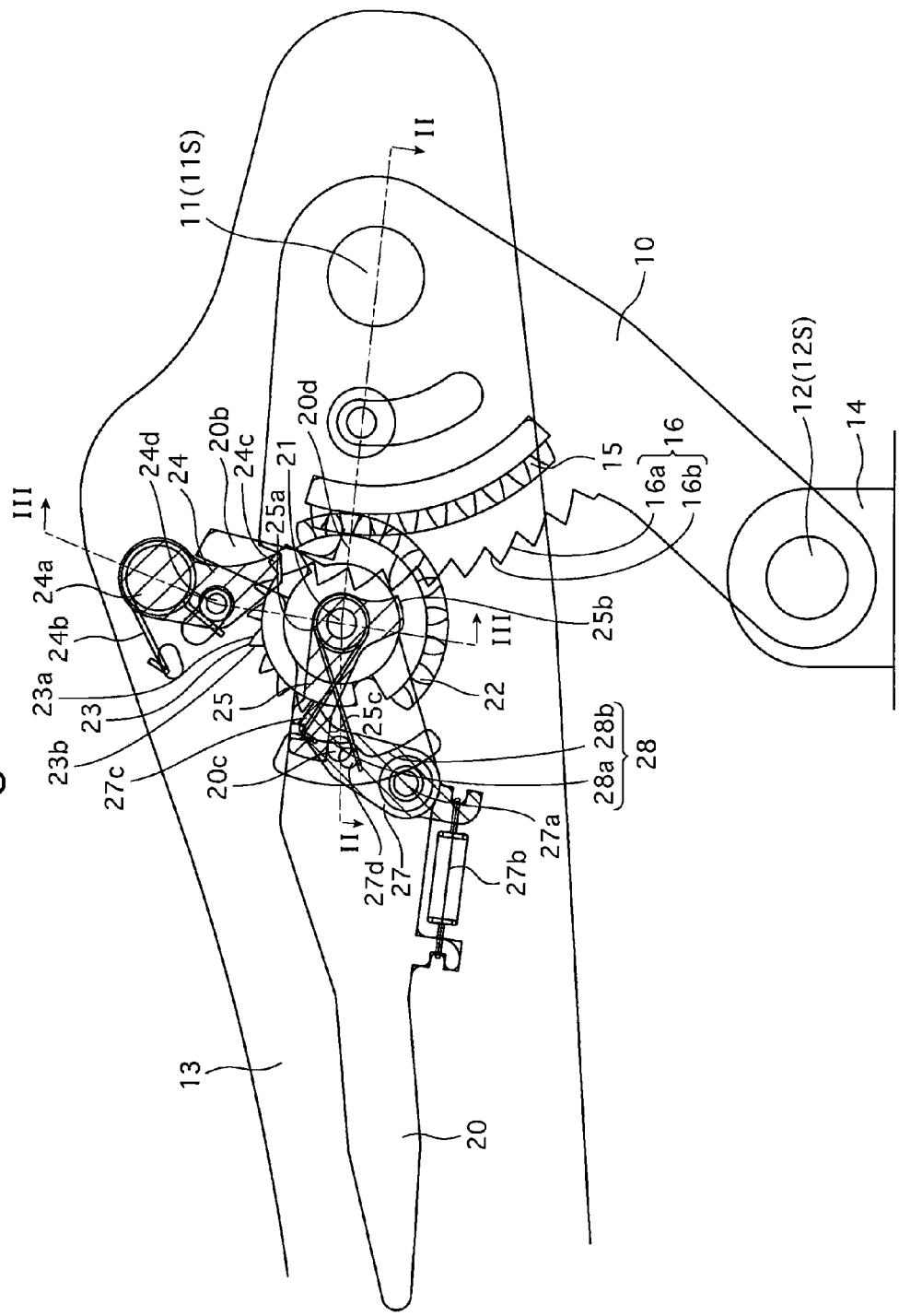
FIG. 4 is a side elevational view of the stepped lifter device, showing a state of being set at a specific height position.

A lifting/lowering link 10 is provided in upper and lower portions thereof with pivot holes 11 and 12 (FIG. 4). The lifting/lowering link 10 is pivoted at the upper pivot hole 11 on a seat bracket (ascending/descending body) 13, which supports a seat (seating surface), via a pivot 11S, and is pivoted at the lower pivot hole 12 on a floor bracket (base) 14, which is integral with a floor surface, via a pivot 12S. Therefore, forward and reverse swing movements of the lifting/lowering link 10 about the pivot hole 11 or the pivot hole 12 cause the seat bracket 13 to move up and down. In the present embodiment, a link pinion 15 and a link ratchet 16 that are positioned on circular arcs about the pivot hole 11 on the seat bracket 13 side are integrally formed on the lifting/lowering link 10. Accordingly, the present embodiment is an example in which the lifting/lowering link 10 and a toothed link are the same member.

A shaft 21 is rotatably supported by the seat bracket 13 (which is a member provided with the pivot 11S that serves as a center of the aforementioned circular arcs of the link pinion 15 and the link ratchet 16) thereon via first and second auxiliary brackets 17 and 18 that are respectively fixed to the back and front of the seat bracket 13, and a control lever (input member) 20 is supported by the shaft 21 to be freely rotatable relative to the shaft 21. Serrated portions 21a and 21b are formed on the shaft 21 at both ends thereof, an input pinion 22 which is in mesh with the link pinion 15 of the lifting/lowering link 10 is coaxially and integrally connected with the serrated portion 21a, and a lifting-directional-motion transmission ratchet 23 which is engaged with the link ratchet 16 is coaxially and integrally connected with the serrated portion 21b. Accordingly, the shaft 21, with which the input pinion 22 and the lifting-directional-motion transmission ratchet 23 are integrally connected, and the control lever 20 are rotatable relative to each other. A neutral projection 20d of the swing motion control lever 20 is caught by a pair of legs 20a1 of a neutral spring 20a that is installed around the shaft 21 so that the control lever 20 is normally held in a neutral position. The swing motion control lever 20 is held in the neutral position when no control force is exerted on the control lever 20. The control lever 20 can be operated to swing up and down, and returns to the neutral position by the force of the neutral spring 20a on release of the control force.

A first latch 24 which is engaged with the link ratchet 16 is pivoted on the seat bracket 13 and the first auxiliary bracket 17 therebetween via a shaft 24a. The first latch 24 is biased by a first latch biasing spring 24b in a direction to make an end pawl 24c of the first latch 24 engaged with teeth of the link ratchet 16. The first latch 24 and the link ratchet 16 constitute a unidirectional rotation-allowance stepped stopper mechanism which allows the lifting/lowering link 10 to swing by allowing the end pawl 24c to ride over the teeth of the link ratchet 16 against the force of the first latch biasing spring 24b when the lifting/lowering link 10 swings about the shaft 11 in the lifting direction (the counterclockwise direction with respect to FIGS. 4 through 13), and prevents the lifting/lowering link 10 from rotating by making the end pawl 24c engaged with teeth of the link ratchet 16 when the lifting/lowering link 10 swings reversely in the lowering direction (the clockwise direction with respect to FIGS. 4 through 13).

The link ratchet 16 is provided with teeth at regular intervals, each of which includes a circular arc surface 16a over which the first latch 24 rides when the lifting/lowering link 10 swings in the lifting direction and a stopper surface 16b which prevents the lifting/lowering link 10 from swinging downward.

A manual-release pin 24d is implanted in a side of the first latch 24. A manual-release projection 20b, which is engaged with the manual-release pin 24d of the first latch 24 to release the engagement between the first latch 24 and the link ratchet 16 when the control lever 20 is operated to swing downward from the neutral position, is formed on the control lever 20. The link ratchet 16, the first latch 24, the manual-release pin 24d and the manual-release projection 20b of the control lever 20 constitute a first lowering prevention latch mechanism which prevents the lifting/lowering link 10 from swinging downward when the control lever 20 is in the neutral position and which allows the lifting/lowering link 10 to swing downward when the control lever 20 is operated to swing in the lowering direction.

A second latch 25 is pivoted about the shaft 21 on the seat bracket 13 (the first and second auxiliary brackets 17 and 18) to be rotatable relative to the control lever 20. The second latch 25 is biased to rotate in a direction to make an end pawl 25b engaged with the link ratchet 16 by a second latch biasing spring 25a which is installed in between the first auxiliary bracket 17 and the second latch 25. A limit pin 20c which comes in contact with a position limit surface 25c of the second latch 25 to define a limit of rotation of the second latch 25 caused by the biasing force of the second latch biasing spring 25a is implanted in the control lever 20. Accordingly, the control lever 20 and the second latch 25 are normally held in a relative rotation position in which the position limit surface 25c of the second latch 25 and the limit pin 20c are in contact with each other. On the other hand, operating the control lever 20 so that it swings in the lowering direction from the neutral position and further operating the control lever 20 so that it swings in the lowering direction with the second latch 25 being in contact with the link ratchet 16 and thereby prevented from rotating causes the control lever 20 to rotate relative to the second latch 25; during this relative rotation the second latch biasing spring 25a is charged.

The control lever 20, the second latch 25 and the link ratchet 16 constitute a second lowering prevention latch mechanism which allows the lifting/lowering link 10 to swing downward by an amount corresponding to one tooth of the link ratchet 16 and thereafter prevents the lifting/lowering link 10 from swinging downward by engagement with the link ratchet 16 before the control lever 20 is made to swing to the lowering limit after the first lowering prevention latch mechanism allows the lifting/lowering link 10 to swing downward. In addition, the limit pin 20c on the control lever 20 and the position limit surface 25c of the second latch 25 constitute a linking portion which makes the second latch 25 swing with the control lever 20 when the control lever 20 is made to swing in the lowering direction from the neutral position, and which makes only the control lever 20 swing in the lowering direction while charging the second latch biasing spring 25a when the control lever 20 further swings in the lowering direction after the second latch 25 is engaged with (comes in contact with) the link ratchet 16.

On the control lever 20 is also pivotally provided, via a shaft 27a, with a motion transmission latch 27 which is provided at a free end thereof with an end pawl 27c that is engaged with the lifting-directional-motion transmission ratchet 23. The motion transmission latch 27 is biased by a latch biasing spring 27b to rotate in a direction to make the end pawl 27c engaged with teeth of the lifting-directional-motion transmission ratchet 23. The motion transmission latch 27 and the lifting-directional-motion transmission ratchet 23 constitute a lifting-direction stepped rotation transmission mechanism in which the end pawl 27c makes the lifting-directional-motion transmission ratchet 23 rotate with the control lever 20 via stopper surfaces 23b when the control lever 20 swings about the shaft 21 in a lifting direction (clockwise direction with respect to FIG. 4 onwards) and in which the end pawl 27c rides over the circular arc surfaces 23a of the lifting-directional-motion transmission ratchet 23 to allow the lifting-directional-motion transmission ratchet 23 to rotate when the control lever 20 swings in a lowering direction (counterclockwise direction with respect to FIG. 4 onwards). The pitch of the teeth of the lifting-directional-motion transmission ratchet 23, which have the circular arc surfaces 23a and the stopper surfaces 23b, corresponds to the pitch of the link ratchet 16, so that a stopper surface 16b of the link ratchet 16 comes in engagement with the first latch 24 when a stopper surface 23b of the lifting-directional-motion transmission ratchet 23 comes in engagement with the motion transmission latch 27.

A manual-release pin 27d is implanted in the motion transmission latch 27 and engaged in a position-limit cam hole 28 formed in the second auxiliary bracket 18 that is fixed to the seat bracket 13. The position-limit cam hole 28 is provided with an opening portion 28a which is in noncontact with the manual-release pin 27d and does not limit the rotation of the motion transmission latch 27 that is caused by the latch biasing spring 27b, and a lock release surface 28b which interferes with the manual-release pin 27d to move the motion transmission latch 27 to the lock release position against the force of the latch biasing spring 27b. The manual-release pin 27d on the motion transmission latch 27 and the position-limit cam hole 28 of the second auxiliary bracket 18 constitute a lowering allowing mechanism which holds the motion transmission latch in an engagement position with respect to the lifting-directional-motion transmission ratchet 23 when the control lever 20 is in the neutral position and which releases the engagement between the motion transmission latch 27 and the lifting-directional-motion transmission ratchet 23 when the control lever 20 is operated to swing in the lowering direction from the neutral position.

FIGS. 4 through 13 are diagrams for illustrating operations of the stepped lifter device that has the above described structure. In FIGS. 4 through 13, all the elements are drawn with solid lines with no regard to the top and bottom positional relationship of each element. As for the second auxiliary bracket 18, only the position-limit cam hole 28 (the opening portion 28a and the lock release surface 28b) that is formed in the second auxiliary bracket 18 is shown; no outline of the second auxiliary bracket 18 is shown. The position-limit cam hole 28 is located at a fixed position on the seat bracket 13. In addition, the first latch 24, the second latch 25 and the motion transmission latch 27, which serve as movable levers, are each hatched. The neutral spring 20a is not shown. The limit pin 20c is a member which is provided on the control lever 20, while the motion transmission latch 27 is a member which is pivoted on the control lever 20 via the pivot 27a.

First, the lowering operation will be hereinafter discussed with reference to FIGS. 4 through 9. FIG. 4 shows a state where the lifting/lowering link 10 (the seat bracket 13) is at the highest (swing motion) position; in this state, the motion transmission latch 27 is engaged with the lifting-directional-motion transmission ratchet 23 and the first latch 24 is engaged with the link ratchet 16 to prevent the lifting/lowering link 10 from swinging downward. The second latch 25, the position of which is limited by the limit pin 20c on the control lever 20, is in a non-engagement position with respect to the link ratchet 16.

Figure 5:
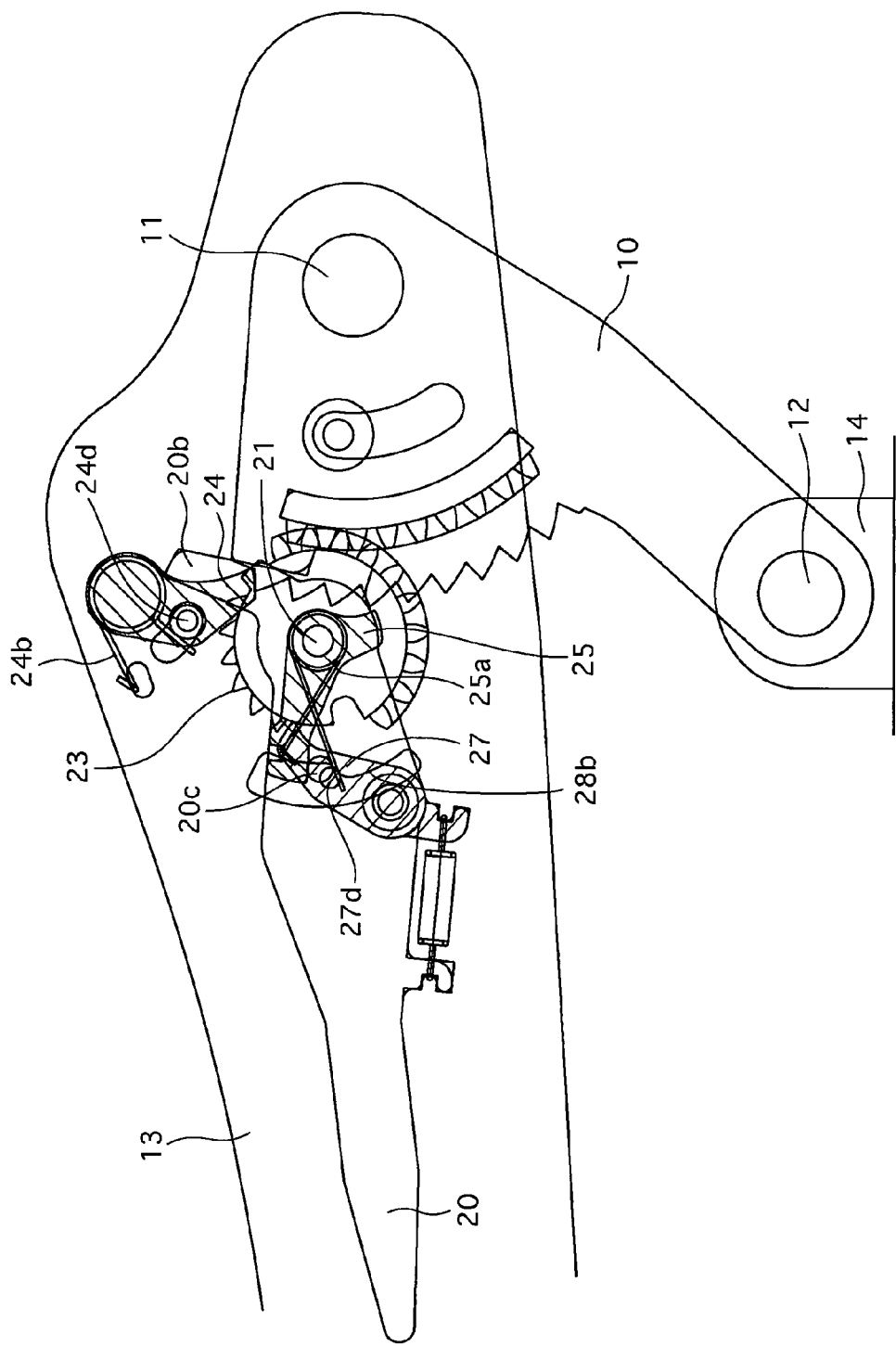
FIG. 5 is a side elevational view of the stepped lifter device, showing the first stage of the lowering operation of the stepped lifter device.
Figure 6:
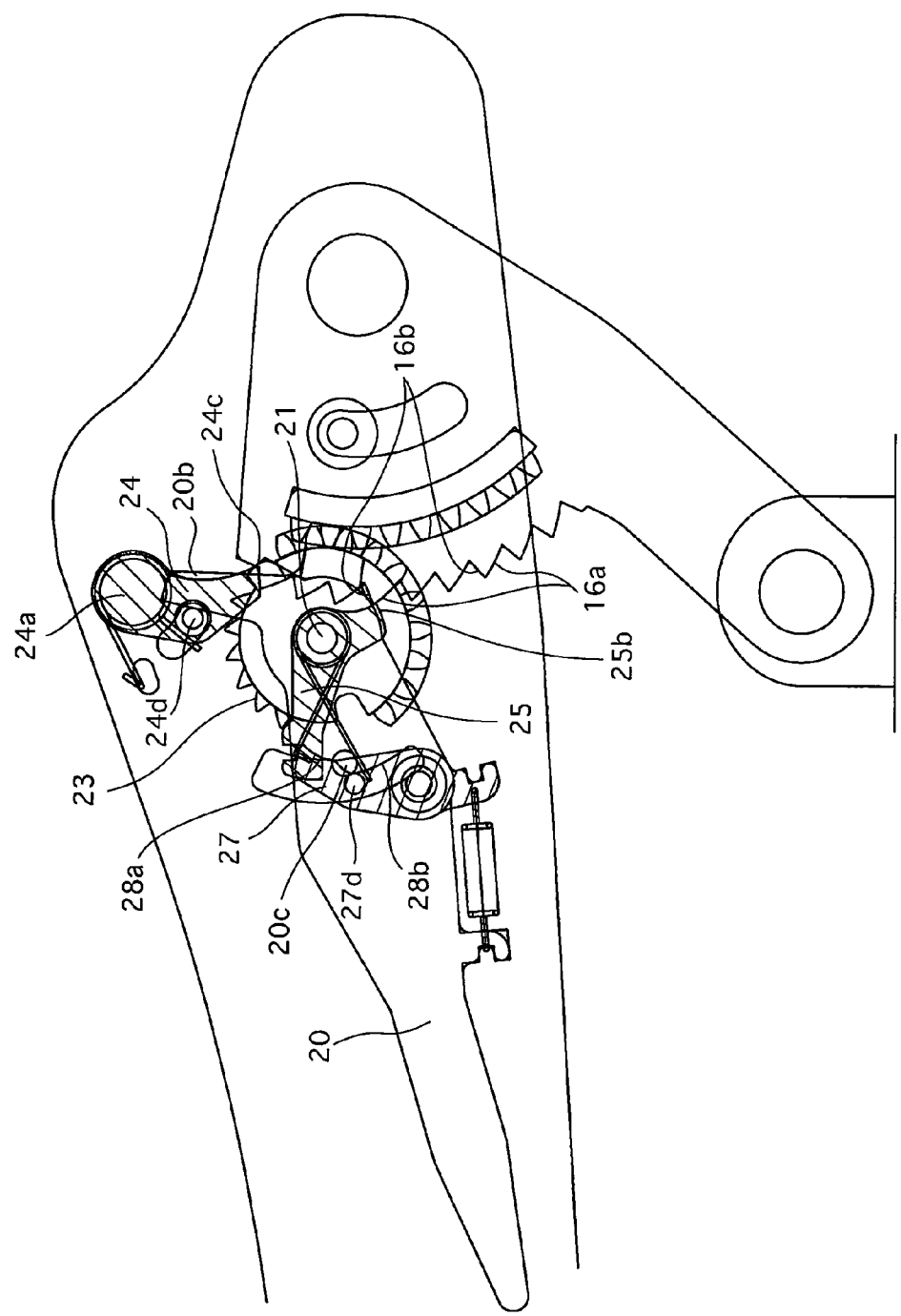
FIG. 6 is a side elevational view of the stepped lifter device, showing the second stage of the same lowering operation.
Figure 7:
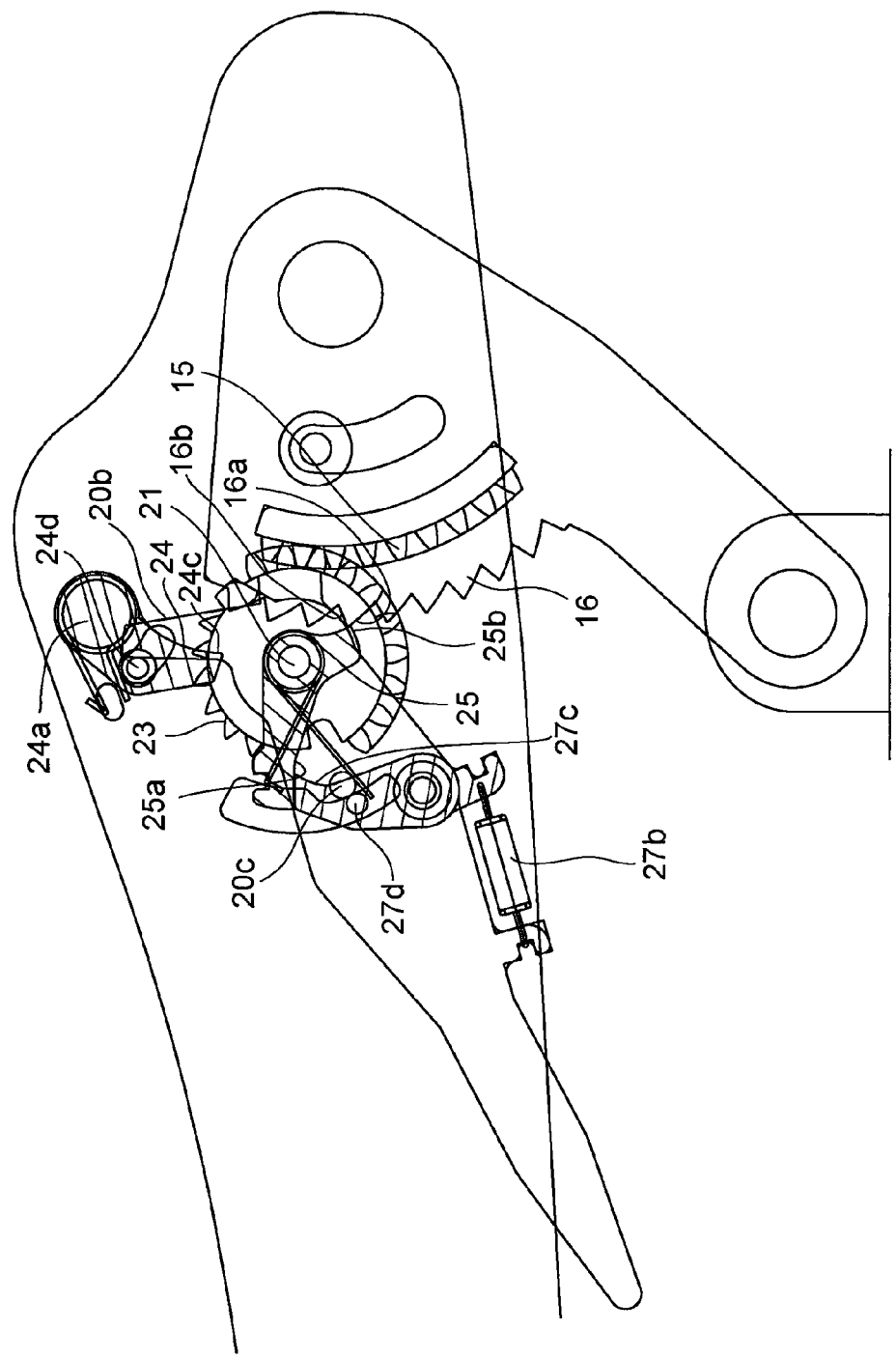
FIG. 7 is a side elevational view of the stepped lifter device, showing the third stage of the same lowering operation.

In the state shown in FIG. 4, operating the control lever 20 in the lowering direction about the shaft 21 causes the position of the manual-release pin 27d of the motion transmission latch 27, which is provided on the control lever 20, in the position-limit cam hole 28 to start to change (FIG. 5). This change in position of engagement of the manual-release pin 27d with the position-limit cam hole 28 from the opening portion 28a to the lock release surface 28b causes the motion transmission latch 27 to move to a non-engagement position with respect to the lifting-directional-motion transmission ratchet 23 against the biasing force of the latch biasing spring 27b (FIGS. 6 and 7). In addition, the manual-release projection 20b of the control lever 20 presses the manual-release pin 24d to make the first latch 24 swing about the shaft 24a, thus causing the end pawl 24c to move to a non-engagement position with respect to the link ratchet 16 (FIG. 7).

Figure 8:
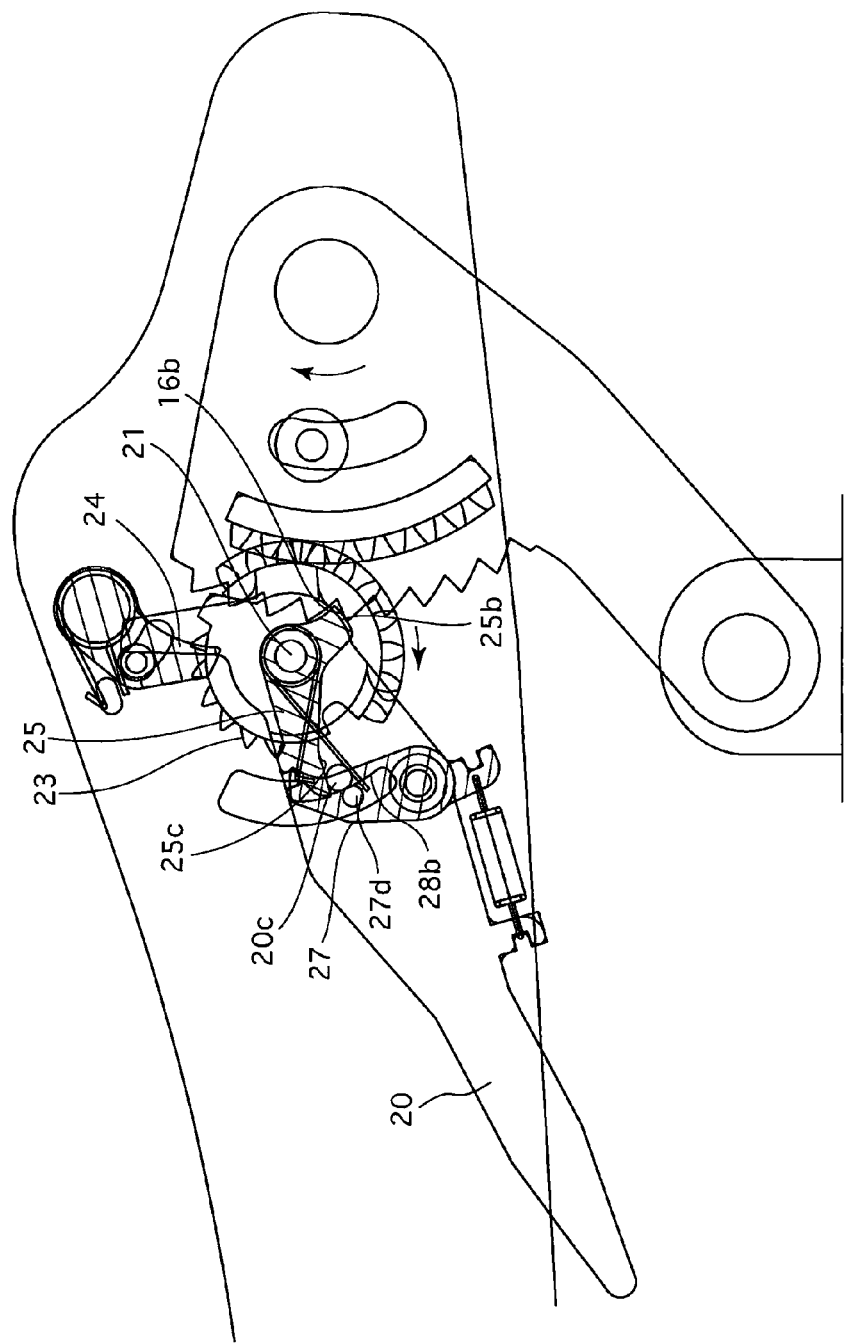
FIG. 8 is a side elevational view of the stepped lifter device, showing the fourth stage of the same lowering operation.

On the other hand, a swing of the control lever 20 in the lowering direction causes the end pawl 25b of the second latch 25 to eventually come in contact and engagement with teeth of the link ratchet 16 to thereby prevent the link ratchet 16 from rotating (FIGS. 6 and 7). This engagement position is determined at a position on the associated circular arc surface 16a of the link ratchet 16 which is closest to the associated stopper surface 16b. In this state, if the control lever 20 continues to rotate in the lowering direction, the limit pin 20c on the control lever 20 is disengaged from the position limit surface 25c of the second latch 25 and the control lever 20 rotates relative to the second latch 25 against the force of the second latch biasing spring 25a (while charging the second latch biasing spring 25a) (FIGS. 6 and 7). Subsequently, as shown in FIG. 7, immediately after the engagement between the first latch 24 and the link ratchet 16 is released to thereby release the rotation limit of the lifting/lowering link 10, the seat bracket 13 moves down under its own weight (and the weight of the seated person). This downward movement of the seat bracket 13 causes the end pawl 25b of the second latch 25 which is in contact with a circular arc surface 16a by the biasing force of the second latch biasing spring 25a to simply slide on this circular arc surface 16a to be engaged with the subsequent stopper surface 16b (FIG. 8). Namely, the lifting/lowering link 10 swings in the lowering direction only by an amount corresponding to one tooth of the link ratchet 16.

Figure 9:
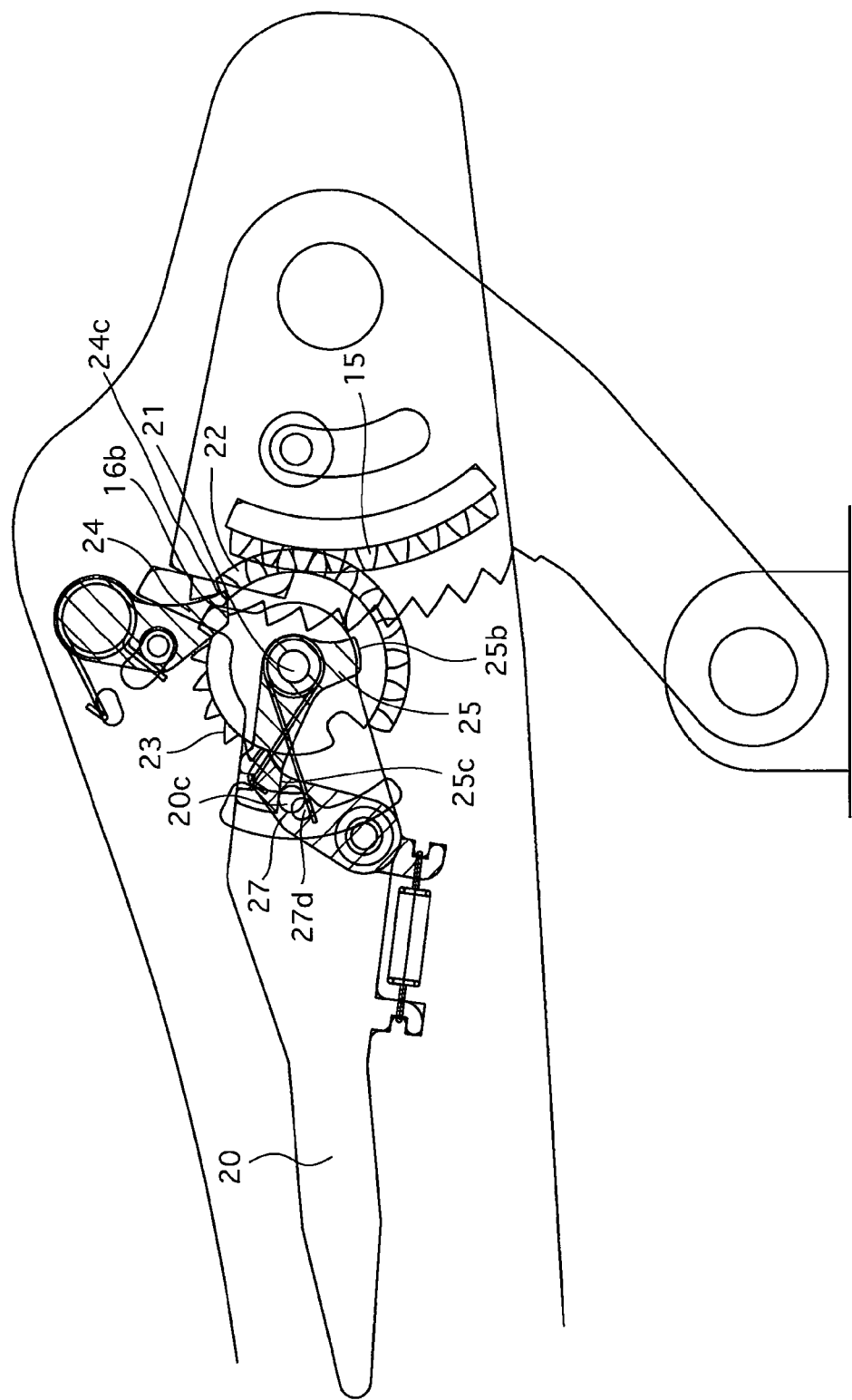
FIG. 9 is a side elevational view of the stepped lifter device, showing a state where the same lowering operation is completed.
Figure 10:
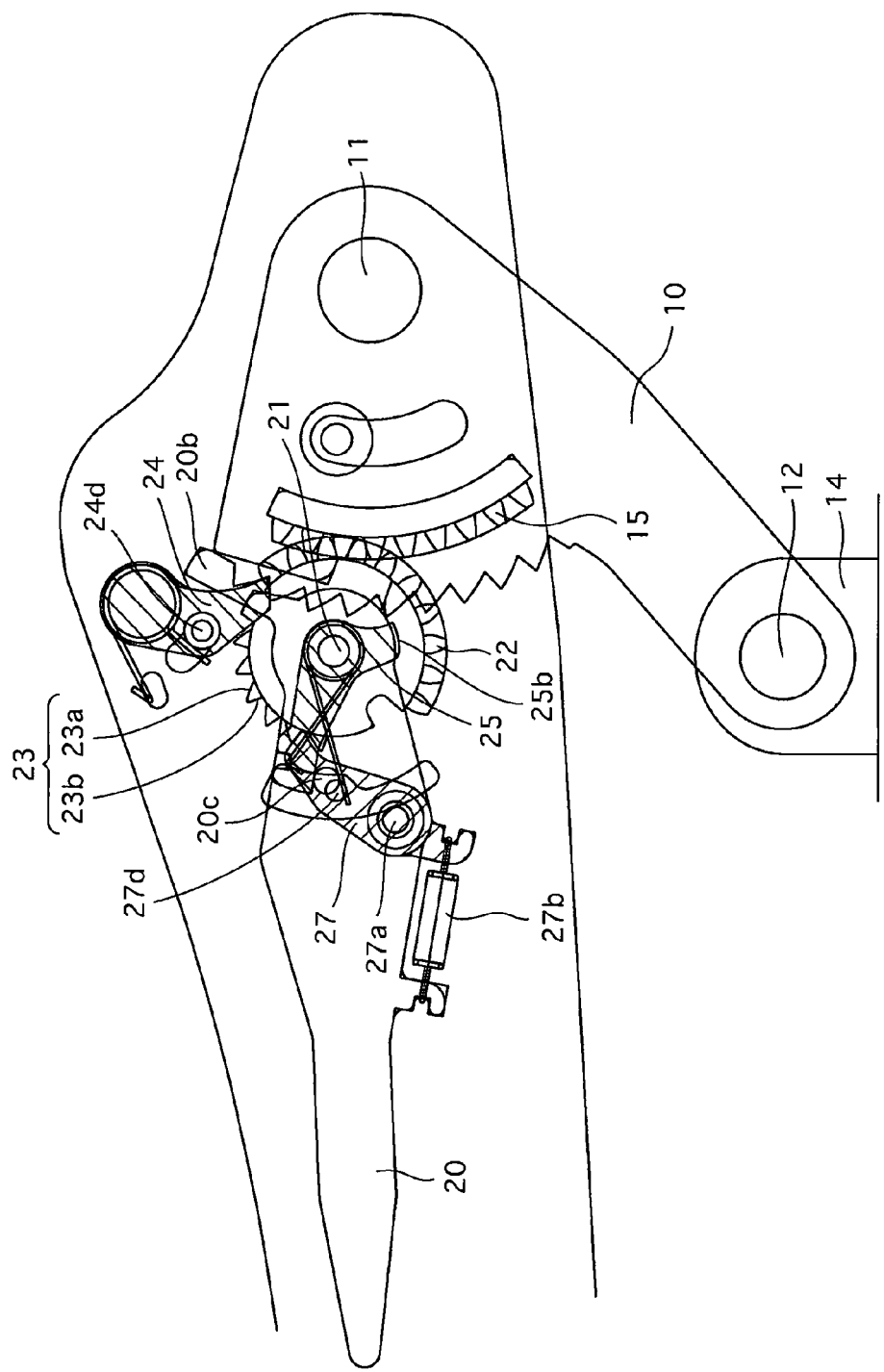
FIG. 10 is a side elevational view of the stepped lifter device, showing the first stage of the lifting operation thereof from the state shown in FIG. 4.

After completion of this stepped lowering operation by an amount corresponding to one tooth, upon the operating force which is exerted on the control lever 20 being released, the control lever 20 returns to the neutral position by the force of the neutral spring 20a (FIG. 9). Immediately after the control lever 20 returns to the neutral position, the limit pin 20c thereof presses the position limit surface 25c of the second latch 25 to make the end pawl 25b disengaged from the link ratchet 16; however, by the time this disengagement occurs, the first latch 24 is engaged with the link ratchet 16 to prevent the seat bracket 13 from moving down. Namely, the second latch 25 prevents the seat bracket 13 from moving downward when the seat bracket 13 moves down, and the first latch 24 prevents the seat bracket 13 from moving downward upon completion of the downward movement of the seat bracket 13 by an amount corresponding to one tooth of the link ratchet 16.

Accordingly, every time the control lever 20 is made to swing once in the lowering direction from the neutral position, the lifting/lowering link 10 moves down an amount corresponding to one tooth of the lifting-directional-motion transmission ratchet 23 and the link ratchet 16.

Next, the lifting operation will be hereinafter discussed with reference to FIGS. 10 through 13. When the control lever 20 is in the neutral position shown in FIG. 10, the second latch 25 holds a position thereof by the force of the second latch biasing spring 25a in which the limit pin 20c on the control lever 20 is continuously in contact with the position limit surface 25c of the second latch 25 and is held in a non-engagement position with respect to the link ratchet 16. Accordingly, the second latch 25 does not have any functional role at all in the lifting operation of the control lever 20. In addition, since the manual-release projection 20b of the control lever 20 moves in a direction away from the manual-release pin 24d of the first latch 24, no force acts on the first latch 24 either. Additionally, since the manual-release pin 27d of the motion transmission latch 27 on the control lever 20 is positioned in the opening portion 28a of the position-limit cam hole 28 and therefore receives no force of any kind, the motion transmission latch 27 is in an engagement position with respect to the lifting-directional-motion transmission ratchet 23 by the force of the latch biasing spring 27b.

Figure 11:
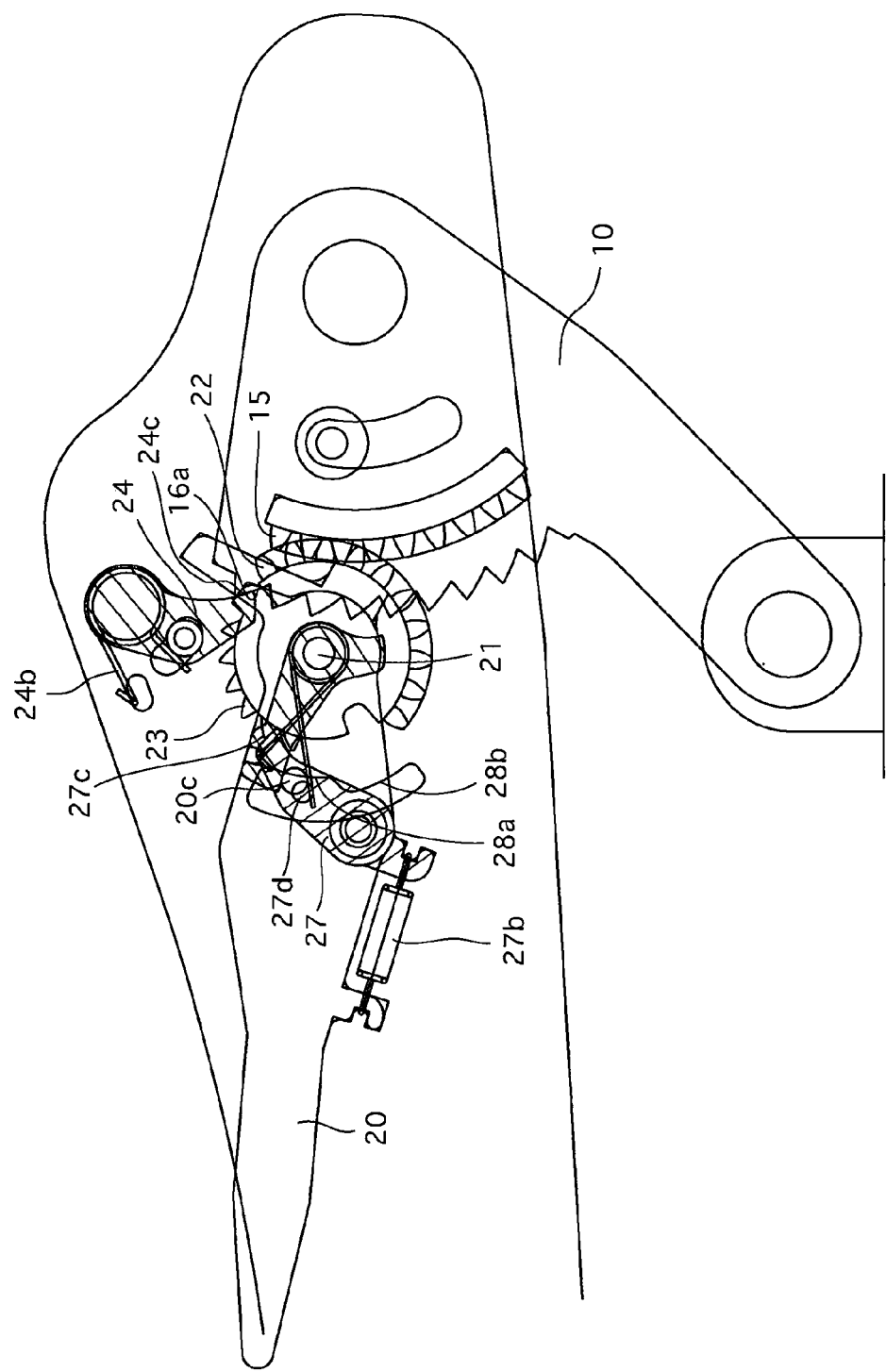
FIG. 11 is a side elevational view of the stepped lifter device, showing the second stage of the same lifting operation.
Figure 12:
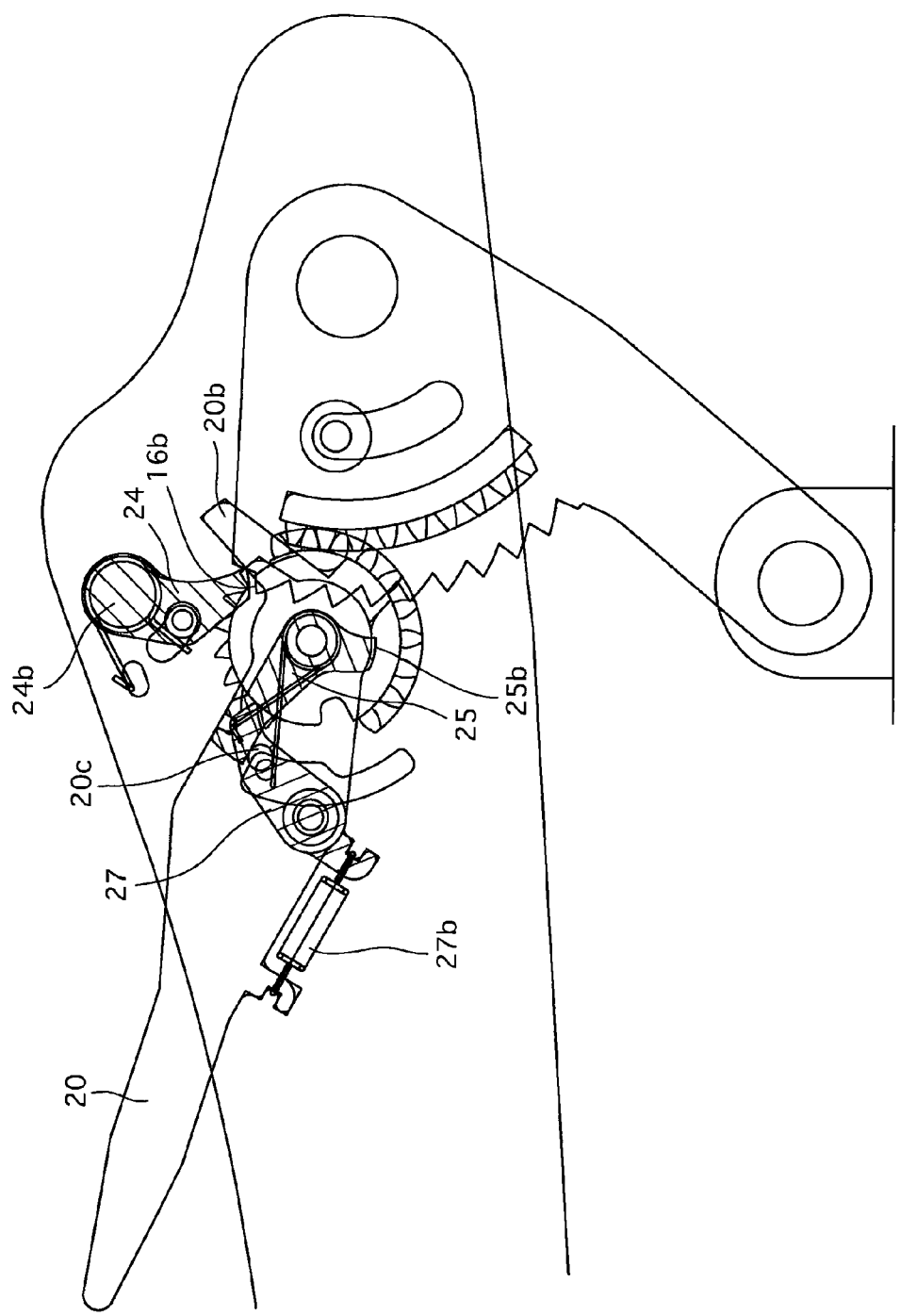
FIG. 12 is a side elevational view of the stepped lifter device, showing the third stage of the same lifting operation.

As shown in FIG. 11, swinging the control lever 20 in the lifting direction from the neutral position causes the motion transmission latch 27, the end pawl 27c of which is engaged with a stopper surface 23b of the lifting-directional-motion transmission ratchet 23, to rotate the lifting-directional-motion transmission ratchet 23 together with the motion transmission latch 27, which in turn causes the input pinion 22 that is integral with the lifting-directional-motion transmission ratchet 23 to rotate. Thereupon, the lifting/lowering link 10, which includes the link pinion 15 that is engaged with the input pinion 22, swings in the lifting direction, the circular arc surfaces 16a of the link ratchet 16 that is formed on the lifting/lowering ring 10 make the first latch 24 swing against the force of the first latch biasing spring 24b (the first latch 24 rides over one tooth of the link ratchet 16), and subsequently, the first latch 24 is engaged with the stopper surface 16b of the subsequent tooth of the link ratchet 16 to perform the lifting operation by an amount corresponding to one tooth of the link ratchet 16 (FIG. 12).

Figure 13:
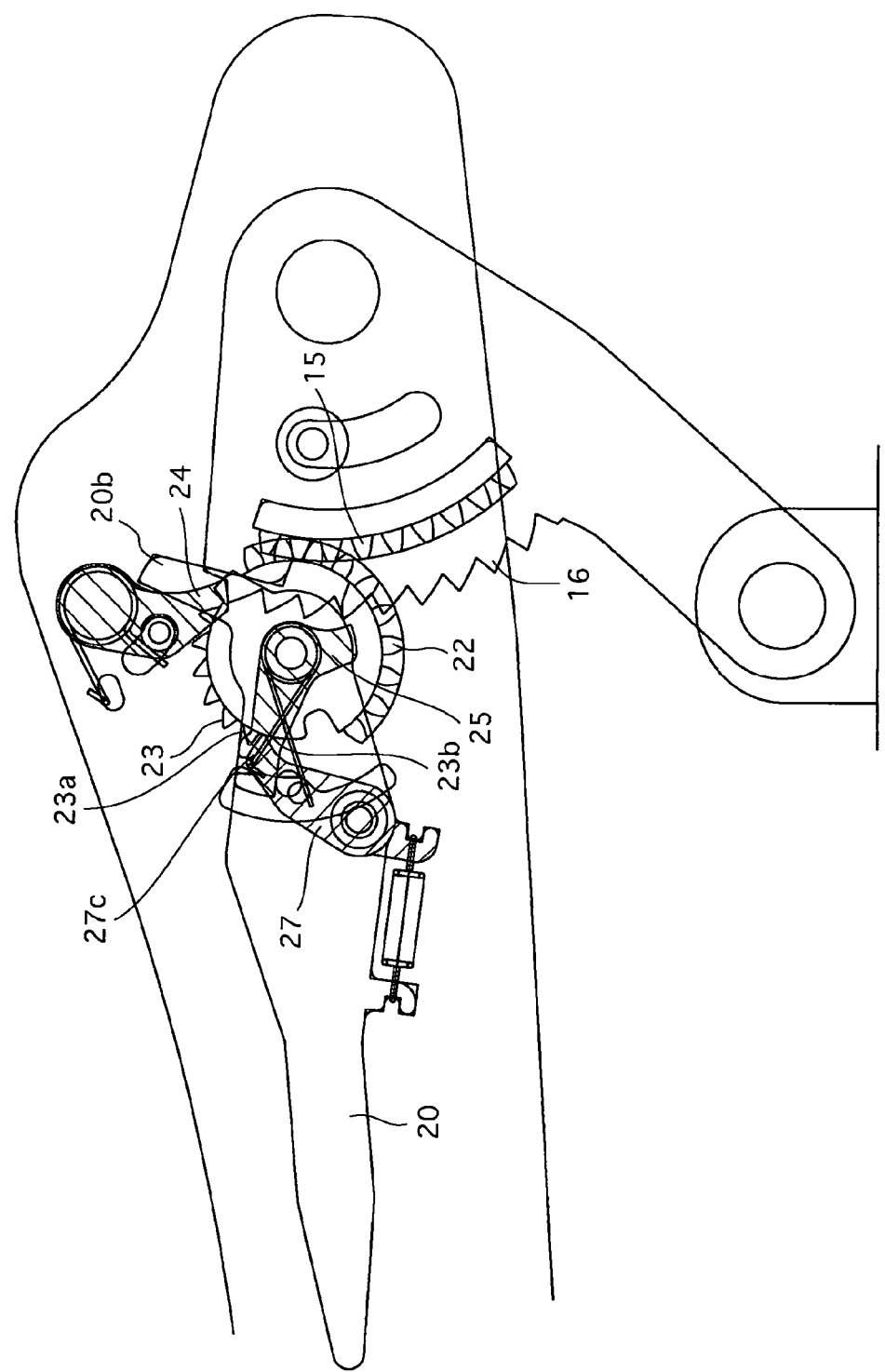
FIG. 13 is a side elevational view of the stepped lifter device, showing a state where the same lifting operation is completed.

Immediately after the operating force exerted on the control lever 20 is released, the control lever 20 returns to the neutral position by the force of the neutral spring 20a (FIG. 13). At this time, the motion transmission latch 27 on the control lever 20 rides over the circular arc surface 23a of the lifting-directional-motion transmission ratchet 23 to be engaged with the subsequent stopper surface 23b. Therefore, every time the control lever 20 is made to swing once in the lifting direction from the neutral position, a lifting-direction stepped rotation transmitting operation in which the lifting/lowering link 10 moves up an amount corresponding to one tooth of the lifting-directional-motion transmission ratchet 23 and the link ratchet 16 is performed.

Figure 14:
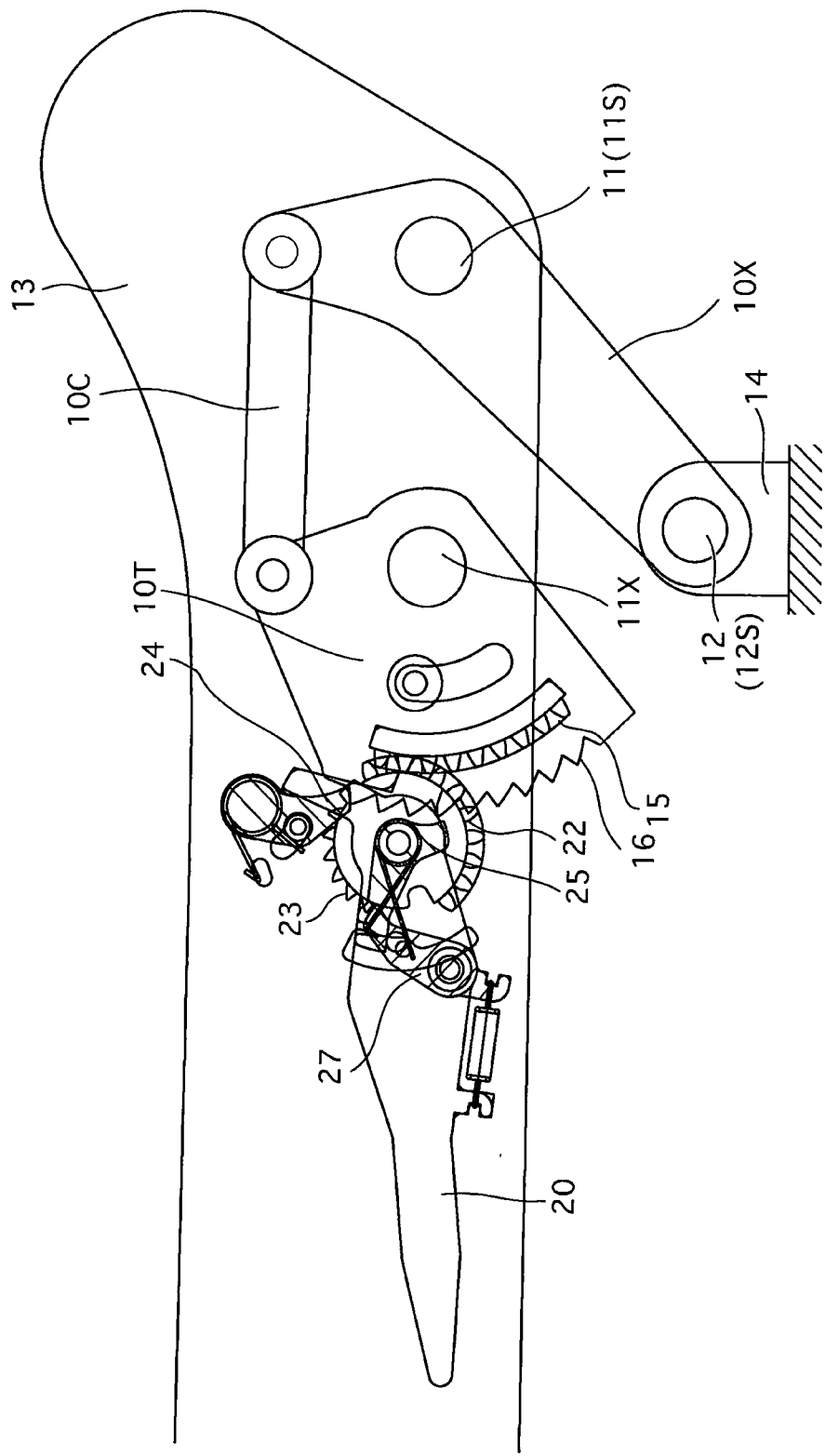
FIG. 14 is a side elevational view of another embodiment of the stepped lifter device according to the present invention.
Figure 15:
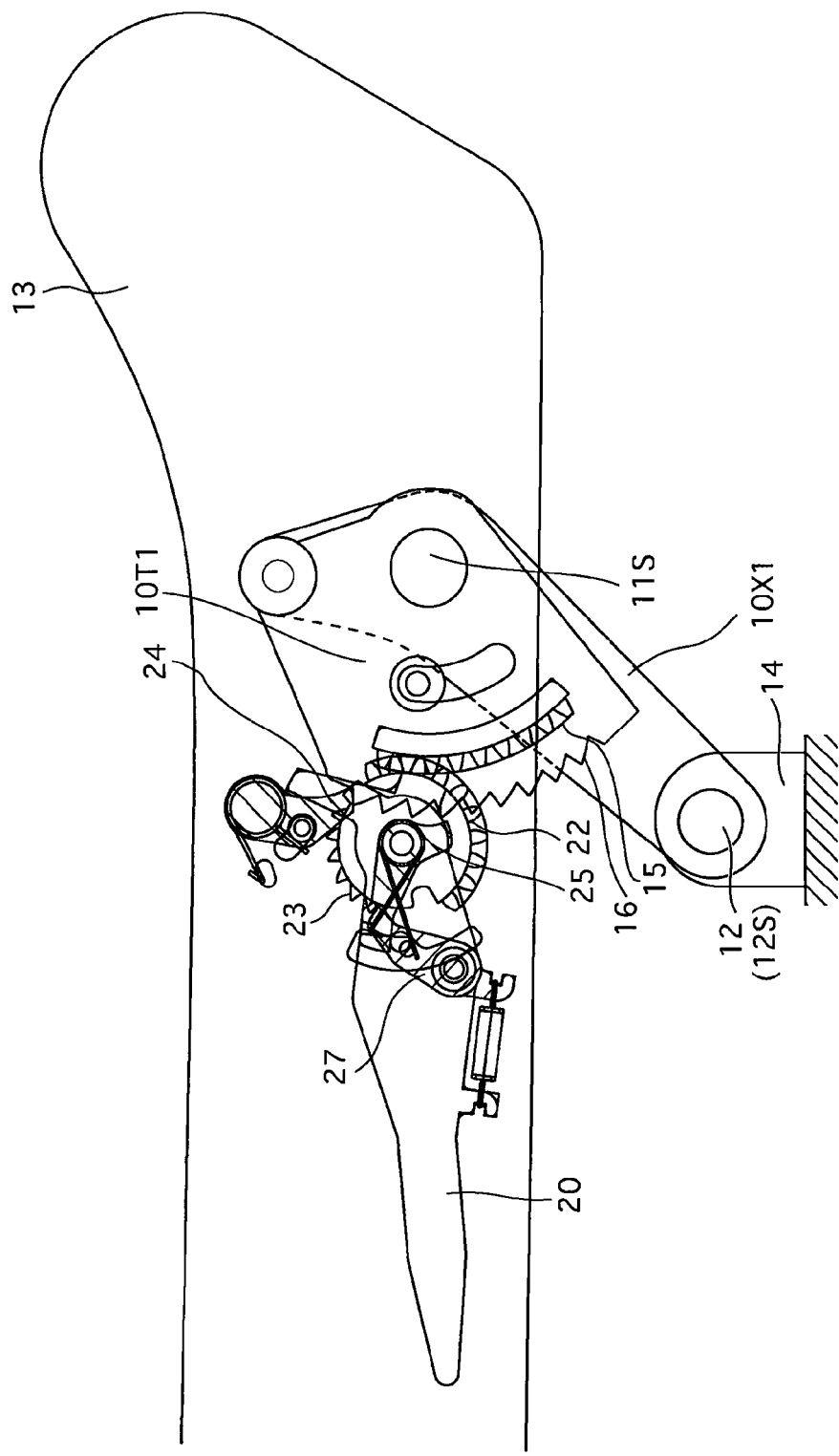
FIG. 15 is a side elevational view of yet another embodiment of the stepped lifter device according to the present invention.

Although the lifting/lowering link 10 is simultaneously a toothed link on which the link pinion 15 and the link ratchet 16 are formed (the lifting/lowering link and the toothed link are the same member) in the above described embodiment, as shown in FIG. 14, the present invention is attained even if a toothed link 10T and a lifting/lowering link 10X are linked with each other to swing in association with each other by providing the lifting/lowering link 10X (upper and lower pivot holes 11 and 12 of which are pivoted to the seat bracket 13 and the base 14, respectively) and the toothed link 10T (which includes the link pinion 15 and the link ratchet 16 and is pivoted on the seat bracket 13 via a shaft 11X) separately from each other and coupling both the links 10X and 10T to each other via a coupling link 10C. Alternatively, as shown in FIG. 15, an embodiment in which a toothed link 10T1 and a lifting/lowering link 10X1 are provided as separate members and in which the toothed link 10T1 is integrally joined to a pivot 11S of the lifting/lowering link 10X1 at a position different from the position of the lifting/lowering link 10X1 in the axial direction of the pivot 11S is also possible. The toothed link 10T1 and the lifting/lowering link 10X1 can also be integrally joined to each other via a coupling member at a position spaced from the pivot 11S.

Although the control lever 20, which can be operated to swing about a shaft, is used as an input member in the above illustrated embodiment, a rotational handle can also be used. In addition, although the above illustrated embodiment relates to a lifter device to which the present invention has been applied, wherein both lifting and lowering operations of the lifter device are stepped, an embodiment in which the lifter device is structured not to be stepped in the lifting direction, in which a mechanism for moving an ascending/descending body from the lowering limit to the lifting limit thereof by a spring force, and in which only a stepped lowering device is used is possible. In an embodiment in which only a stepped lowering device is used, the link pinion 15, the input pinion 22, the lifting-directional-motion transmission ratchet 23 and the motion transmission latch 27 can be omitted.

In addition, although the link ratchet 16, which is positioned on a circular arc about the pivot 11S on the seat bracket 13 side, is formed on the lifting/lowering link 10 in the above illustrated embodiment, the present invention is also attained even if a link ratchet which is positioned on a circular arc about the pivot 12S on the base 14 side is formed on the lifting/lowering 10. In such an embodiment, the control lever 20, the first lowering prevention latch mechanism (which includes the first latch 24 and the link ratchet 16), the second lowering prevention latch mechanism (which includes the second latch 25 and the link ratchet 16) and the lifting-direction stepped rotation transmission mechanism (which includes the lifting-directional-motion transmission ratchet 23 and the motion transmission latch 27), which are all mounted on the seat bracket 13 in the above illustrated embodiment, only need to be installed on the base 14 side.

Although the above described embodiment is a vehicle seat lifting/lowering device to which the present invention has been applied, the present invention can also be applied to a lifting/lowering apparatus for an ordinary chair or a working bench or table (ascending/descending body).

INDUSTRIAL APPLICABILITY

The stepped lowering device and the stepped lifter device have industrial applicability because these devices that are capable of stepwisely lowering an ascending/descending body by reciprocating swing motion of an input member between a neutral position and a down position can each be obtained with a simple structure.

EXPLANATIONS OF LETTERS OR NUMERALS

10 Lifting/lowering link (Toothed link)
11 12 Pivot holes
11S 12S Pivots
13 Seat bracket (Ascending/descending body)
14 Floor bracket (base)
15 Link pinion
16 Link ratchet
17 First auxiliary bracket
18 Second auxiliary bracket
20 Control lever (Input member)
20a Neutral spring
20b Manual-release projection
20c Limit pin (Linking portion)
21 Shaft
22 Input pinion
23 Lifting-directional-motion transmission ratchet
24 First latch
24a Shaft
24b First latch biasing spring
24c End pawl
24d Manual-release pin
25 Second latch
25a Second latch biasing spring
25b End pawl
25c Position limit surface (Linking portion)
27 Motion transmission latch
27a Shaft
27b Latch biasing spring
27c End pawl
27d Manual-release pin
28 Position-limit cam hole
28a Opening portion
28b Lock release surface

The invention claimed is:

1. A stepped lowering device comprising:
a lifting/lowering link having a first pivot on a base and a second pivot on an ascending/descending body;
a toothed link which is pivoted on one of said base and said ascending/descending body via said first or said second pivot, includes a link ratchet positioned on a circular arc about said first or said second pivot, and swings in association with said lifting/lowering link;
an input member, supported by the one of said ascending/descending body and said base that includes the first or the second pivot that serves as a center of said circular arc of said link ratchet, to be operated to swing between a neutral position and a down position;
a first lowering prevention latch mechanism comprising a first latch, said first latch is engaged with said link ratchet to prevent said toothed link from swinging downward when said input member is in said neutral position and which allows said toothed link to swing downward when said input member is operated to swing in a lowering direction; and
a second lowering prevention latch mechanism comprising a second latch, said second latch allows said toothed link, which is allowed to swing downward by said first lowering prevention latch mechanism, to swing downward by an amount corresponding to one tooth of said link ratchet, and which is engaged with said link ratchet to prevent said toothed link from further swinging downward.

2. The stepped lowering device according to claim 1, wherein said second lowering prevention latch mechanism further comprises:
a biasing spring which biases and rotates said second latch in a direction to make said second latch engaged with said link ratchet; and
a linking portion which is installed between said input member and said second latch and defines a limit of rotation of said second latch caused by said biasing spring, and
wherein said linking portion causes said second latch to swing with said input member when said input member is made to swing in said lowering direction from said neutral position, and causes only said input member to swing in said lowering direction while charging said biasing spring when said input member further swings in said lowering direction after said second latch is engaged with said link ratchet immediately before said first lowering prevention latch mechanism allows said toothed link to swing downward.

3. The stepped lowering device according to claim 1, further comprising a neutral-position returning device which returns said input member to said neutral position upon an operating force which is exerted on said input member being released, wherein said first lowering prevention latch mechanism prevents said toothed link from swinging downward when said input member is in said neutral position.

4. The stepped lowering device according to claim 1, wherein said lifting/lowering link and said toothed link are the same member.

5. The stepped lowering device according to claim 1, wherein said lifting/lowering link and said toothed link are separate members from each other and linked with each other via a coupling link.

6. The stepped lowering device according to claim 1, wherein said lifting/lowering link and said toothed link are separate members from each other and integrally joined to the pivot of said lifting/lowering link on said base side or the pivot of said lifting/lowering link on said ascending/descending body side at different positions in an axial direction of the pivot.

7. A stepped lifter device equipped with the stepped lowering device according to claim 1, wherein said input member can be operated to further swing in a lifting direction from said neutral position, and wherein said stepped lowering device further comprises a lifting-direction stepped rotation transmission mechanism which transmits rotation of said input member to said lifting/lowering link when said input member is operated to swing in said lifting direction from said neutral position.

8. The stepped lifter device according to claim 7, wherein said lifting-direction stepped rotation transmission mechanism comprises:

a lifting-directional-motion transmission ratchet supported to be capable of rotating relative to said input member;

a motion transmission latch which is supported by said input member and engaged with said lifting-directional-motion transmission ratchet, and said motion transmission latch rotates said lifting-directional-motion transmission ratchet with said input member when said input member is made to swing upward;

an input pinion which rotates in association with said motion transmission ratchet; and a link pinion which is formed on said toothed link and engaged with said input pinion.

9. The stepped lifter device according to claim 7, further comprising a neutral-position returning device which returns said input member to said neutral position upon an operating force which is exerted on said input member being released, wherein said stepped lifter device does not transmit rotation of said input member to said lifting/lowering link when said input member returns to said neutral position.

10. A stepped lowering device comprising:

a lifting/lowering link having a first pivot on a base and a second pivot on an ascending/descending body;

a toothed link which is pivoted on said ascending/descending body via said second pivot, includes a link ratchet positioned on a circular arc about said second pivot, and swings in association with said lifting/lowering link;

an input member, supported by said ascending/descending body that includes the second pivot that serves as a center of said circular arc of said link ratchet, to be operated to swing between a neutral position and a down position;

a first lowering prevention latch mechanism comprising a first latch, said first latch is engaged with said link ratchet to prevent said toothed link from swinging downward when said input member is in said neutral position and which allows said toothed link to swing downward when said input member is operated to swing in a lowering direction; and a second lowering prevention latch mechanism comprising a second latch, said second latch allows said toothed link, which is allowed to swing downward by said first lowering prevention latch mechanism, to swing downward by an amount corresponding to one tooth of said link ratchet, and which is engaged with said link ratchet to prevent said toothed link from further swinging downward.

* * * * *